(12) United States Patent
Brauel et al.

(10) Patent No.: US 8,090,831 B2
(45) Date of Patent: Jan. 3, 2012

(54) CONSISTENT POLICY CONTROL OF OBJECTS IN A SERVICE ORIENTED ARCHITECTURE

(75) Inventors: Björn Brauel, Mühltal (DE); Harald Schöning, Dieburg (DE)

(73) Assignee: Software AG, Darmstadt (DE)

( * ) Notice: Subject to any disclaimer, the term of this patent is extended or adjusted under 35 U.S.C. 154(b) by 313 days.

(21) Appl. No.: 12/031,478

(22) Filed: Feb. 14, 2008

(65) Prior Publication Data

US 2008/0288651 A1    Nov. 20, 2008

(30) Foreign Application Priority Data

Mar. 14, 2007  (EP) .................................... 07005279

(51) Int. Cl.
*G06F 15/173* (2006.01)
(52) U.S. Cl. .................. 709/226; 709/223; 719/331
(58) Field of Classification Search .................. None
See application file for complete search history.

(56) References Cited

U.S. PATENT DOCUMENTS

| | | | | |
|---|---|---|---|---|
| 2005/0080893 | A1* | 4/2005 | Castellanos et al. | 709/224 |
| 2006/0242292 | A1* | 10/2006 | Carter | 709/224 |
| 2007/0294420 | A1* | 12/2007 | Mohindra et al. | 709/230 |
| 2008/0126287 | A1* | 5/2008 | Cox et al. | 706/48 |

OTHER PUBLICATIONS

European search report for application No. EP 07 00 5279, search completed Sep. 18, 2007.
Yau, et al., "An Adaptable Security Framework for Service-based Systems", Object-Oriented Real-Time Dependable Systems, 10th IEEE International Workshop on Sedona, AZ, Feb. 2, 2005, 8 pages.
Snoeck, "Existence dependency: The Key to Semantic Integrity Between Structural and Behavioral Aspects of Object Types", IEEE Transactions on sofware Engineering, Apr. 1998, 20 pages.
Maximelian, et al., "A Framework and Ontology for Dynamic Web Services Selection", IEEE Internet Computing, Sep. 2004, retrieved from internet: http://ieeexplore.ieee.org/search/wrapper.jsp?arnumber=1336749, 10 pages.

* cited by examiner

*Primary Examiner* — Duyen Doan
(74) *Attorney, Agent, or Firm* — Meyertons Hood Kivlin Kowert & Goetzel, P.C.; Jeffrey C. Hood; Joel L. Stevens

(57) ABSTRACT

A method for the consistent control of policies assigned to objects of a service oriented architecture is disclosed. Each policy may include one or more assertions, and the method may include identifying one or more operational dependencies between at least two SOA objects, analyzing the assigned policies of the at least two SOA objects to determine any inconsistency, and issuing a warning to a user if an inconsistency has been determined.

18 Claims, 4 Drawing Sheets

Figure 1:
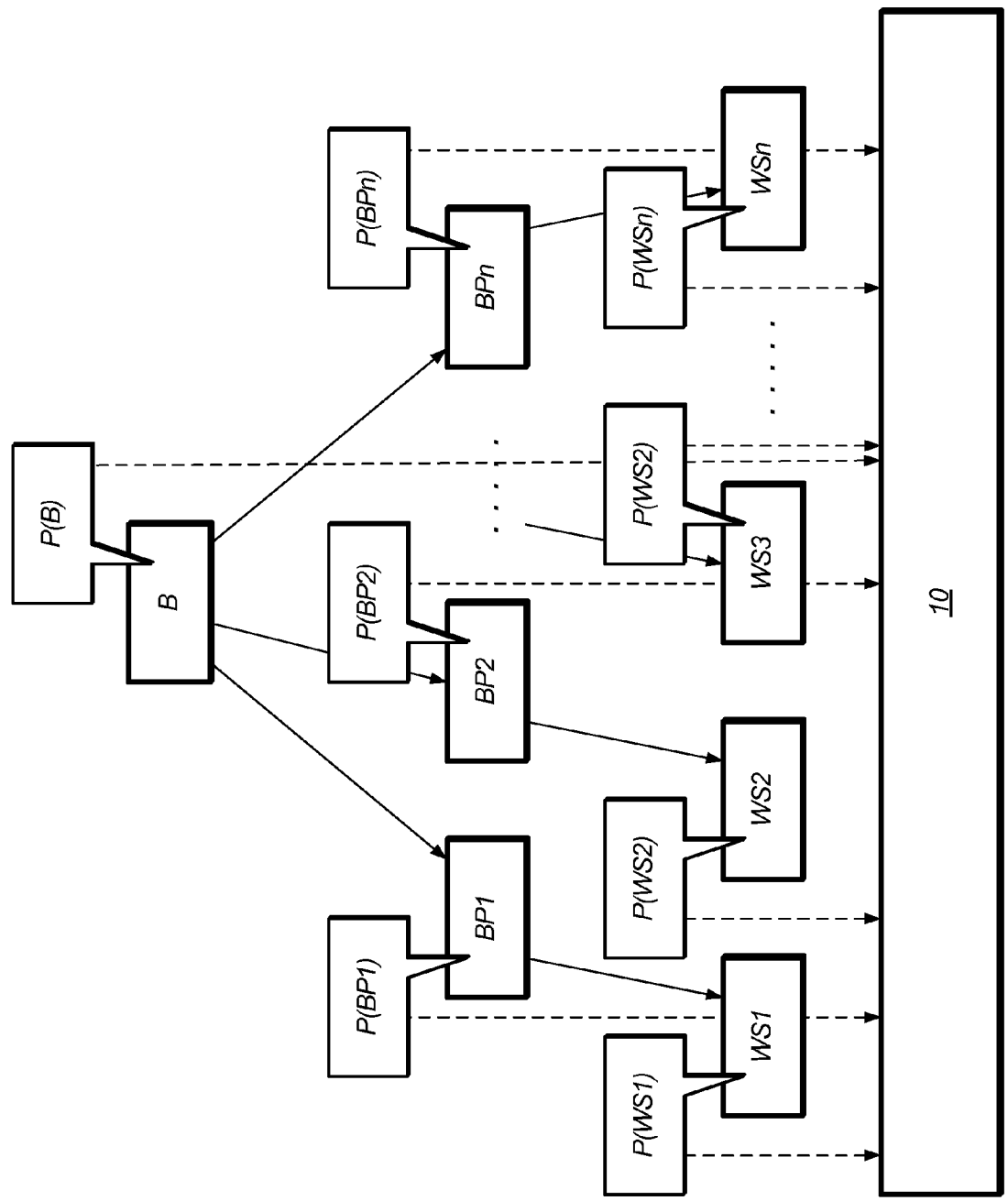

```
<ws:definitions name="StockQuote" targetNamespace="http://www.fabrikam123.example.com/stock/binding"
  xm1ns:tns="http://www.fabrikam123.example.com/stock/binding" xm1ns:fab="http://www.fabrikam123.example.com/stock"
  xm1ns:rmp="http://schemas.xm1soap.org/ws/2005/02/rm/policy"
  xm1ns:sp="http://schemas.xm1soap.org/ws/2005/07/securitypolicy" xm1ns:wsd1="http://schemas.xm1soap.org/wsd1/"
  xm1ns:wsoap12="http://schemas.xm1soap.org/wsd1/soap12/" xm1ns:wsp="http://schemas.xm1soap.org/ws/2004/09/policy"
  xm1ns:wsu="http://docs.oasis-open.org/wss/2004/01/oasis-200401-wss-wssecurity-utility-1.0.xsd">
<wsp:Policy wsu:Id="RmPolicy">
  <rmp:RMAssertion>
    <rmp:InactivityTimeout Milliseconds="600000" />
    <rmp:BaseRetransmissionInterval Milliseconds="3000" />
    <rmp:ExponentialBackoff />
    <rmp:AcknowledgementInterval Milliseconds="200" />
  </rmp:RMAssertion>
</wsp:Policy>
<wsp:Policy wsu:Id="X509EndpointPolicy" >
  <sp:AsymmetricBinding>
    <wsp:Policy><!—Details omitted for readability →
      <sp:Include Timestamp />
      <sp:OnlySignEntireHeadersAndBody />
    </wsp:Policy>
  </sp:AsymmetricBinding>
</wsp:Policy>
</wsp:Policy wsu:Id="secureMessagePolicy">
  <sp:SignedParts>
    <sp:Body />
  <sp:SignedParts>
  <sp:EncryptedParts>
    <sp:Body />
  <sp:EncryptedParts>
</wsp:Policy>
<wsoap 12:operation soapAction="http://www.fabrikam123.example.com/stock/Quote/GetLastTradePriceRequest" />
<wsd1:input>
  <wsoap 12:body use="literal" />
  <wsp:PolicyReference URI="#SecureMessagePolicy" wsd1:required="true" />
<wsd1:input>
<wsd1:output>
  <wsoap 12:body use="literal" />
  <wsp:PolicyReference URI="#SecureMessagePolicy" wsd1:required="true" />
 <wsd1:output>
 <wsd1:operation>
<wsd1:binding>
<wsd1:definitions>
```

*FIG. 2a*

```
<businessService serviceKey="[]">
  <name>[]</name>
  <description>[]</description>
  <bindingTemplates>[]</bindingTemplates>
  <categoryBag>
    <keyedReference keyName="Policy Expression for example's Web services"
        keyValue="http://www.example.com/myservice/policy"
        tModelKey="uuid:a27078e4-fd38-320a-806f-6749e84f8005" />
  </categoryBag>
</businessService>
```

*FIG. 2b*

| SAML Assertion | ▼ |
|---|---|

Name: EnforceAuthentication
Description: ...
SAML Authority: localhost:1331
Include Token: //*
Require Derived: ☑ — 40
Require Identifier: ☐
Token Version: V1.0
    V1.0
    V1.1
    V2.0

*FIG. 4*

CONSISTENT POLICY CONTROL OF OBJECTS IN A SERVICE ORIENTED ARCHITECTURE

PRIORITY CLAIM

This application claims benefit of priority of European application no. 07 005 279.0 titled "Method and Registry for Policy Consistency Control", filed Mar. 14, 2007, whose inventors are Björn Brauel and Harald Schöning.

INCORPORATED BY REFERENCE

European application no. 07 005 279.0 titled "Method and Registry for Policy Consistency Control", filed Mar. 14, 2007, whose inventors are Björn Brauel and Harald Schöning, is hereby incorporated by reference in its entirety as though fully and completely set forth herein.

TECHNICAL FIELD

The present invention relates to a method and a registry for the consistent control of policies assigned to objects of a service oriented architecture (SOA).

DESCRIPTION OF THE RELATED ART

In a service oriented (software) architecture (SOA), various processing objects are made available to a user in the network as independent services that can be accessed in a standardized way. The objects of the SOA interoperate based on formal definitions which are independent from the underlying hardware and software platform and programming language. The interface definition encapsulates the specific implementations. An SOA is independent of a specific development technology (such as Java and .NET). As a result, the software components become very reusable because the interfaces are standards-compliant and independent from the underlying implementation of the processing logic. For example, a C# (C Sharp) service could be used by a JAVA application and vice versa. Most definitions of an SOA use SOAP requests conveyed via HTTP/HTTPS over TCP/IP. However, an SOA may use any service-based technology.

SOA objects may have complex interrelationships with one another. As shown in FIG. 1, a process B might call several other processes B1, . . . Bn, which may in turn call some web services W1 . . . Wn. Further, each SOA object can be subject to one or multiple policies. Such policies comprise one or more assertions, for example stating some technical performance characteristics such as a maximum response time of 500 ms, a throughput limitation to a certain number of calls per second, an access restriction to a certain time period, or to a certain set of users. The assertions of a policy of an SOA object may additionally be combined using Boolean operators, e.g., a maximum response time below 20 ms AND not more than five simultaneous users.

As shown in FIG. 1, a policy P( . . . ) may be attached to each of the SOA objects, e.g., to the overall process B, the processes BP1 . . . BPn and the low-level web services WS1-WSn. In SOAs of the prior art, policies are individually controlled and stored in a registry of the SOA (see dashed arrows in FIG. 1). However, there can be a potential inconsistency in the policy definitions or even a conflict. For example, if an assertion in the policy P(B) of the overall process B states that the process B has a maximum response time of 100 ms but the policy of a further SOA object directly or indirectly used during the execution of the process B (e.g. the web service W2 in FIG. 1) only guarantees a maximum response time of 200 ms, this leads to a technical conflict of the two performance policies. It is apparent that such inconsistencies are difficult to oversee in the case of a large SOA, which comprises hundreds of objects calling each other at run-time.

Correspondingly, improvements in maintaining an SOA are desired.

SUMMARY OF THE INVENTION

Various embodiments are presented of a method for maintaining consistent control of policies assigned to objects of a service oriented architecture (SOA). Each policy may include one or more assertions. The method may include identifying one or more operational dependencies between at least two SOA objects. The method may further include analyzing the assigned policies of the at least two SOA objects to determine any inconsistency. The method may include issuing a warning to a user, if an inconsistency has been determined.

Accordingly, rather than individually treating the policies assigned to the various objects, the dependencies of the various SOA objects may be first identified, wherein this information may be subsequently used for the determination of any inconsistency in the definition of the policies of the involved SOA objects.

In one embodiment, the first of the above indicated method steps may include the deriving of the one or more dependencies from object descriptions stored at design time in a registry of the SOA. The registry information may in this embodiment be used to infer policy conflicts. A SOA registry can keep track of a usage chain of the various SOA objects, for example by creating a dependency relationship graph from the top level business process B down to the lowest level web services WSi.

In another embodiment, identifying the one or more operational dependencies may include analyzing the dependencies between the at least two SOA objects during runtime. In other words, monitoring the interaction between the various SOA objects during runtime may provide information, e.g., which process calls which service, etc. so that their policies can then be correspondingly verified.

Analyzing the dependencies may include, in one example, starting the analysis with the policy of a lower-level SOA object and comparing the policy with the policy of a higher-level SOA object, which calls the lower-level SOA object during runtime. Such a bottom-up approach in the consistency check may be particularly easy to implement, e.g., in the registry of the SOA.

Whereas no warning may be issued if all of the assertions of the policy of the lower-level SOA object are included in the assertions of the policy of the higher-level SOA object, a warning may be issued if at least one of the assertions of the lower-level SOA object is not included in the assertions of the policy of the higher-level SOA object.

If an assertion of the policy of the lower-level SOA object is from a different type than all of the assertions of the higher-level SOA object, said assertion could be propagated as a conditional assertion of the policy of the higher-level SOA object depending on the call of the lower-level SOA object during runtime. However, it is also possible that an assertion of the policy of the lower-level SOA object is from a different type than one of the assertions of the higher-level SOA object but nevertheless implies a restriction on said assertion of the higher-level SOA object, which may be correspondingly modified.

In one embodiment, the assertions in the policies of one or more SOA objects may relate to the run-time of the SOA and comprise an assertion relating to at least one of the following group: response time, throughput, number of concurrent users, availability, user authentication and/or authorization, encryption and/or digital signing, among others.

The methods described above may be implemented using a registry for an SOA and/or as program instructions stored on a memory medium.

SHORT DESCRIPTION OF THE DRAWINGS

Figure 3:
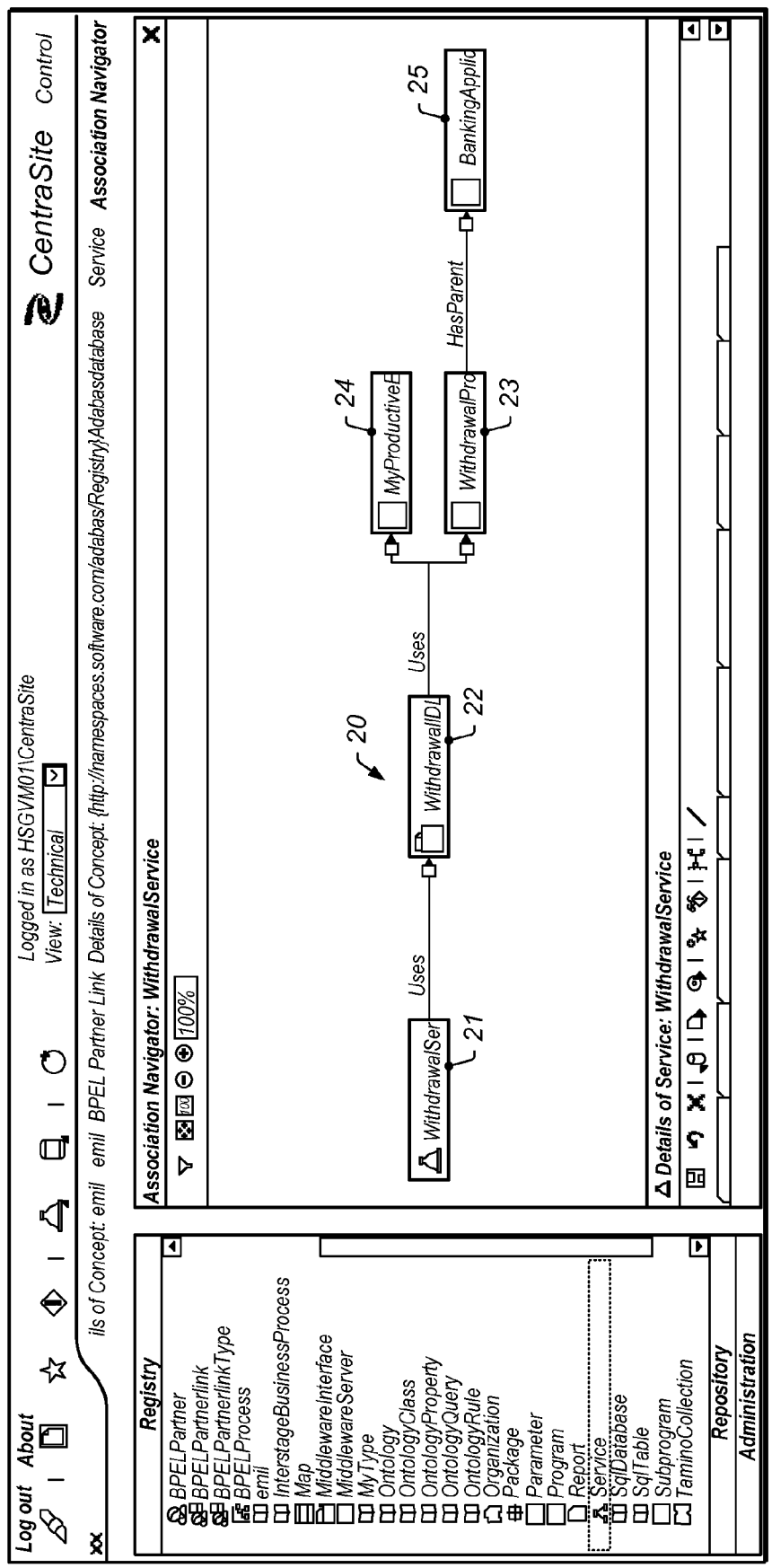

In the following detailed description presently preferred embodiments of the invention are further described with reference to the following figures:

FIG. 1: A simplified SOA with a plurality of interacting objects and their related policies, according to one embodiment;

FIG. 2a, b: Examples of policies for an SOA object as part of a WSDL file and according to the UDDI standard, according to one embodiment;

FIG. 3: An example of a dependency graph presented in the Association Navigator tool of a registry in one embodiment of the present invention, according to one embodiment; and FIG. 4: A window for modifying/creating an assertion of a policy including a checkbox for consistency control, according to one embodiment.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS

Various embodiments are presented of a method for maintaining consistent control of policies assigned to objects of a service oriented architecture (SOA).

FIG. 1

FIG. 1 presents an example of a simplified SOA. A process B may call upon execution various other processes BP1 . . . BPn, which in turn may call web services WS1 to WSn. The operational dependencies between the web services of the SOA shown in FIG. 1 are simplified. For example, there might be a process BPx calling during execution not only a single but a plurality of web services WSx, WSy, WSz (not shown in FIG. 1). In the exemplary SOA of FIG. 1, each of the SOA objects may be provided with a policy P. However, this is not essential. On the contrary, only a subset of the objects of the SOA may be provided with a policy which comprises one or more assertions or a single object may have more than one assigned policy. It is apparent that the likelihood of the occurrence of any of the inconsistencies described above between the various policies increases with their number.

The policies assigned to at least some of the objects of the SOA may relate to different functional aspects. A policy of an SOA object may, for example, contain assertions relating to the design time of the SOA such as the compliance of the respective object with a certain standard or a certain schema. In another example, the policy may comprise assertions relating to changes of the SOA such as the life cycle of the related SOA object, its approval and/or version, among others. The technically most relevant field may be policies relating to the run-time of the SOA, wherein assertions for a SOA object may be made concerning the authentication, the authorization, encryption, signing, its availability, response time, the throughput, and/or the number of concurrent users, among others.

FIGS. 2A and 2B

FIGS. 2a and 2b illustrate how these policies can be realized. FIG. 2a presents an example of a part of a WSDL file used for the description of a web service of the SOA. As can be seen, the WSDL file may include various tags </wsp:policy> indicating assertions made for the respective web service such as an acknowledge interval of 200 ms. FIG. 2b illustrates another example of an implementation of a policy using the UDDI standard.

In one embodiment, the usage and dependency relationships between SOA objects may be at first identified using the SOA registry 10 (cf. FIG. 1). In other words, the SOA registry 10 may not only store the various policies P( . . . ) for retrieval but may identify operational dependencies between the various objects. This is schematically illustrated in FIG. 3, which shows an Association Navigator tool of an embodiment of the registry of the present invention. In the example of FIG. 3, the Association Navigator presents a dependency graph 20 for the SOA object "WithdrawalService" 21. As can be seen, the SOA object 21 may be directly or indirectly dependent on a plurality of further SOA objects 22 to 25. The SOA registry 10 may allow in the example of FIG. 3 to obtain such a dependency graph for each of the objects of the SOA having an assigned policy.

Once the dependencies of the SOA objects are identified they may be used to find policy conflicts and potential policy conflicts in the following manner. Starting at "leaf objects" of the SOA, e.g., objects such as the web services WS1 . . . WSn in FIG. 1, which may be used by other objects, but themselves may not use other SOA objects, the assertions of the related policies P(WS1) . . . P(WSn) may be analyzed as follows:

If an "including assertion" of the same type exists at the upper level of the SOA, no conflict may exist. An including assertion is an assertion having the same condition or a less restrictive condition than the assertion of the lower-level. This is, for example, the case, if the policy of WS1 contains an assertion of a maximum response time of 20 ms and the (sub-) process BP1 on the next upper level of the SOA has a policy with an assertion of a maximum response time of 50 ms. In such a situation the process BP1 may always be able to operate in accordance with its policy, since the assertion in the policy of the web service WS1 on which BP1 depends is more restrictive than the assertion of the same type of the policy of BP1. Accordingly, there may be no conflict of the two policies of WS1 and BP1.

By contrast, if an "excluding" assertion of the same type exists, a conflict may be detected and a corresponding alert may be issued. In the above example this is the case, if the upper level has a policy with an assertion of a response time of 10 ms. This assertion may not always be met, since the process BP1 depends on the web service WS1, which may according to its assertion respond only after 15 ms.

If no assertion of the same type (for example "maximum response time") exists, a conditional assertion may be created for the upper level, e.g., for the policy of the process BP1. A conditional assertion is an assertion which states "if subordinate X is called, at least the following assertion holds: . . . ". In the above discussed example, such a conditional assertion for the policy of BP1 could read: "if subordinate WS1 is called, the maximum response time is at least 20 ms".

If A is an assertion of a component X which uses component Y having an assertion B, further examples of an assertion A including the assertion B are as follows:

A covers smaller time interval than B (applies e.g. to "availability"—if Y is available from 7-12, X can be available from 8-11)

A covers a larger time interval than B (applies e.g. to "closeout time"—if Y is unavailable from 7-12, X can be unavailable from 6-12)

A has larger value than B (e.g. max. response time)

A has lower value than B (e.g. throughput)

A covers subset of B (e.g. authorized persons)

In addition to including and excluding assertions or assertions relating to different types, there can also be a cross-over of two assertions, for example concerning the response time of an SOA objects indicated in seconds and throughput indicated in number of calls per second. In an exemplary situation, a sub-system of the SOA is supposed to serve up to 10 users concurrently (first assertion) with a response time of up to 1 second for each call (second assertion). If a further SOA object is dependent on this sub-system and declared as being capable of providing throughput up to 1000 calls/second, there is a conflict between the crossed-over first and second assertions and the assertion of the policy of the object calling the subsystem.

Once a potential conflict is detected between two or more policies, the registry may provide an option for the user to investigate the conflict. Thereafter, the user can decide that there is no real conflict, for example if experience has shown that an actual response time is much shorter than indicated in the assertion of a policy of a certain web service so that the limits of the assertion in the policy of a SOA object calling this web service are practically always met. In this case, this statement of the user is stored in the registry and the potential conflict is no longer reported.

The assertions of the SOA objects on the various levels may be recursively propagated from the lower levels of the SOA until the top(s) of the dependency graph are reached. When a conditional assertion is found, it may be treated like a normal one unless multiple conditional assertions come together. In this case, it may be checked which one is an including assertion of the other, and only this one may be not discarded. For example, if WS1 is available from 7 am to 7 pm, and WS2 is available from 8 am to 7 pm, the resulting/remaining conditional assertion is 8 am-7 pm. The conditional assertions may be used in case of a possible conflict to explain to the user why there could be a conflict, which might not be evident to the user otherwise—for example, if B shall be available from 7 am to 7 pm and B uses BP2 which uses in turn WS2 which is available from 8 am to 6 pm only.

The above described recursive bottom-up strategy for analyzing the policies of the object of an SOA is only one possible approach. Other methodologies might equally be used, for example a top-to-bottom approach. In general, inference machines can be used to check the policies of an SOA for consistency, once the rules for including, excluding and conditional assertions are defined for all relevant types of assertions occurring in the policies of the SOA. Such inference machines are commercially available (cf. for example www.ontoprise.de, www.racer-systems.com, http://kaon2.semanticweb.org) and could be called by the registry during the consistency verification.

Generally, a user may be automatically notified about one or more conflicts in an SOA, e.g., by the registry, either when changing a policy of one or more objects, attaching a new policy to one or more objects, and/or creating or modifying a new dependency among the objects (among other situations). In one or more of these situations, the new dependency graph for the affected objects of the SOA may be analyzed as explained above. In another embodiment, a window as shown in FIG. 4 might be presented to a user, e.g., whenever a policy of an SOA object is added or modified. The checkbox 40 may allow the user to decide whether a consistency verification for the modified policy should be carried out.

In addition, the whole SOA with all its objects to which a policy has been assigned, could be analyzed for inconsistencies, e.g., when a user actively asks for such a check or as a regularly scheduled task. Performing such an analysis may help to reduce the number of inconsistencies and thereby make the policies of the various SOA objects more reliable. This applies even if the described method and registry might not be able to detect all inconsistencies of the SOA, for example if there is a cross-over of more than two assertions.

Although the embodiments above have been described in considerable detail, numerous variations and modifications will become apparent to those skilled in the art once the above disclosure is fully appreciated. It is intended that the following claims be interpreted to embrace all such variations and modifications.

The invention claimed is:

1. A method for controlling consistency of policies assigned to objects of a service oriented architecture (SOA), wherein the method comprises:

utilizing a computer system to perform:

identifying one or more operational dependencies between at least two SOA objects, wherein each operational dependency indicates direct or indirect use of at least one SOA object by at least one other SOA object, wherein the at least two SOA objects have respective assigned policies, wherein each policy comprises at least one assertion, wherein each assertion specifies a required condition or limitation of one or more attributes of the SOA object, wherein assertions of the same type are with respect to the same set of attributes, and wherein assertions of different types are with respect to different sets of attributes;

analyzing the assigned policies of the at least two SOA objects to determine any inconsistency, wherein said analyzing comprising starting the analysis with a policy of a lower-level SOA object and comparing the policy with a policy of a higher-level SOA object calling the lower-level SOA object during runtime, wherein an assertion of the policy of the lower-level SOA object is of a different type than each of the assertions of the higher-level SOA object;

propagating the assertion as a conditional assertion of the policy of the higher-level SOA object depending on the call of the lower-level SOA object during runtime, wherein the conditional assertion of the policy of the higher-level SOA object comprises the assertion of the policy of the lower-level SOA object contingent upon calling of the lower-level SOA object; and issuing a warning to a user if an inconsistency has been determined.

2. The method of claim 1, wherein said identifying comprises deriving the one or more operational dependencies from object descriptions stored at design time in a registry of the SOA.

3. The method of claim 1, wherein said identifying comprises analyzing the dependencies between the at least two SOA objects during runtime.

4. The method of claim 1, wherein a warning is issued if at least one of the assertions of the lower-level SOA object is not included in the assertions of the policy of the higher-level SOA object.

5. The method of claim 1, wherein an assertion of the policy of the lower-level SOA object is of a different type than one of the assertions of the higher-level SOA object but implies a restriction on said assertion of the higher-level SOA object, and wherein the method further comprises:
   modifying the assertion of the higher-level SOA object based on the assertion of the policy of the lower-level SOA.

6. The method of claim 1, wherein no warning is issued if all of the assertions of the policy of the lower-level SOA object are included in the assertions of the policy of the higher-level SOA object.

7. The method of claim 1, wherein the assertions in the policies of one or more SOA objects belong to at least one of the following categories: design time, change-time or run-time of the SOA.

8. The method of claim 7, wherein the assertions in the policies of one or more SOA objects belong to the run-time category and comprise an assertion relating to at least one of the following group: response time, throughput, number of concurrent users, availability, user authentication and/or authorization, encryption and/or digital signing.

9. The method of claim 1, wherein said analyzing is performed using an inference machine.

10. A non-transitory computer accessible memory medium storing program instruction for controlling consistency of policies assigned to objects of a service oriented architecture (SOA), wherein the program instructions are executable to:
   identifying one or more operational dependencies between at least two SOA objects, wherein each operational dependency indicates direct or indirect use of at least one SOA object by at least one other SOA object, wherein the at least two SOA objects have respective assigned policies, wherein each policy comprises at least one assertion, wherein each assertion specifies a required condition or limitation of one or more attributes of the SOA object, wherein assertions of the same type are with respect to the same set of attributes, and wherein assertions of different types are with respect to different sets of attributes;
   analyzing the assigned policies of the at least two SOA objects to determine any inconsistency, wherein said analyzing comprising starting the analysis with a policy of a lower-level SOA object and comparing the policy with a policy of a higher-level SOA object calling the lower-level SOA object during runtime, wherein an assertion of the policy of the lower-level SOA object is of a different type than each of the assertions of the higher-level SOA object;
   propagating the assertion as a conditional assertion of the policy of the higher-level SOA object depending on the call of the lower-level SOA object during runtime, wherein the conditional assertion of the policy of the higher-level SOA object comprises the assertion of the policy of the lower-level SOA object contingent upon calling of the lower-level SOA object; and
   issuing a warning to a user if an inconsistency has been determined.

11. The non-transitory memory medium of claim 10, wherein said identifying comprises deriving the one or more operational dependencies from object descriptions stored at design time in a registry of the SOA.

12. The non-transitory memory medium of claim 10, wherein said identifying comprises analyzing the dependencies between the at least two SOA objects during runtime.

13. The non-transitory memory medium of claim 10, wherein a warning is issued, if at least one of the assertions of the lower-level SOA object is not included in the assertions of the policy of the higher-level SOA object.

14. The non-transitory memory medium of claim 10, wherein an assertion of the policy of the lower-level SOA object is of a different type than one of the assertions of the higher-level SOA object but implies a restriction on said assertion of the higher-level SOA object, and wherein the program instructions are further executable to:
   modify the assertion of the higher-level SOA object based on the assertion of the policy of the lower-level SOA.

15. The non-transitory memory medium of claim 10, wherein no warning is issued if all of the assertions of the policy of the lower-level SOA object are included in the assertions of the policy of the higher-level SOA object.

16. The non-transitory memory medium of claim 10, wherein the assertions in the policies of one or more SOA objects belong to at least one of the following categories: design time, change-time or run-time of the SOA.

17. The non-transitory memory medium of claim 16, wherein the assertions in the policies of one or more SOA objects belong to the run-time category and comprise an assertion relating to at least one of the following group: response time, throughput, number of concurrent users, availability, user authentication and/or authorization, encryption and/or digital signing.

18. A system comprising:
   a processor; and
   a memory medium coupled to the processor, wherein the memory medium stores program instruction for controlling consistency of policies assigned to objects of a service oriented architecture (SOA), wherein the program instructions are executable by the processor to:
      identifying one or more operational dependencies between at least two SOA objects, wherein each operational dependency indicates direct or indirect use of at least one SOA object by at least one other SOA object, wherein the at least two SOA objects have respective assigned policies, wherein each policy comprises at least one assertion, wherein each assertion specifies a required condition or limitation of one or more attributes of the SOA object, wherein assertions of the same type are with respect to the same set of attributes, and wherein assertions of different types are with respect to different sets of attributes;
      analyzing the assigned policies of the at least two SOA objects to determine any inconsistency, wherein said analyzing comprising starting the analysis with a policy of a lower-level SOA object and comparing the policy with a policy of a higher-level SOA object calling the lower-level SOA object during runtime, wherein an assertion of the policy of the lower-level SOA object is of a different type than each of the assertions of the higher-level SOA object;
      propagating the assertion as a conditional assertion of the policy of the higher-level SOA object depending on the call of the lower-level SOA object during runtime, wherein the conditional assertion of the policy of the higher-level SOA object comprises the assertion of the policy of the lower-level SOA object contingent upon calling of the lower-level SOA object; and
      issuing a warning to a user if an inconsistency has been determined.

* * * * *